3 Sheets—Sheet 1

A. W. TERRILL.
Excavator.

No. 209,432. Patented Oct. 29, 1878.

Witnesses
Fred L. Dieterich
Wm. Hister

Inventor
Anderson Wood Terrill
By Myers & Co.
Attys.

N. PETERS, PHOTO-LITHOGRAPHER, WASHINGTON, D.C.

3 Sheets—Sheet 3.

A. W. TERRILL.
Excavator.

No. 209,432. Patented Oct. 29, 1878.

Witnesses
Fred G. Dieterich
Chas. R. Searle

Inventor
Anderson W. Terrill
by Myers & Co.

N. PETERS, PHOTO-LITHOGRAPHER, WASHINGTON, D. C.

UNITED STATES PATENT OFFICE.

ANDERSON W. TERRILL, OF MEXICO, MISSOURI.

IMPROVEMENT IN EXCAVATORS.

Specification forming part of Letters Patent No. 209,432, dated October 29, 1878; application filed March 21, 1878.

*To all whom it may concern:*

Be it known that I, A. W. TERRILL, of Mexico, in the county of Audrain and State of Missouri, have invented certain new and useful Improvements in Excavators; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
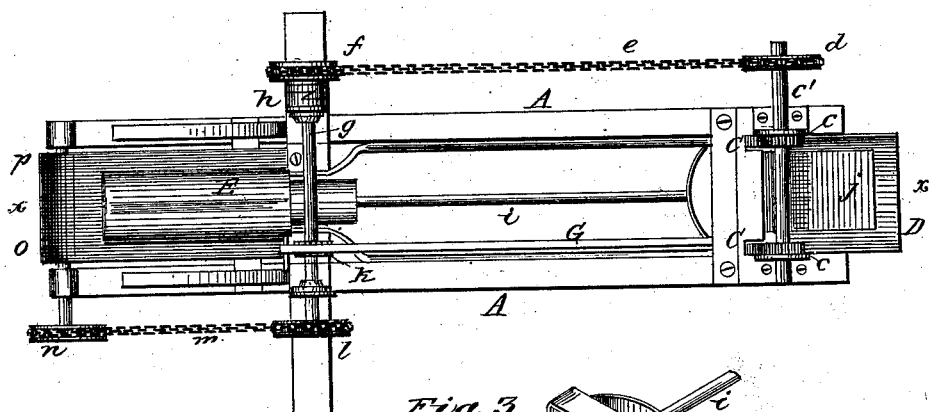
Figure 3:
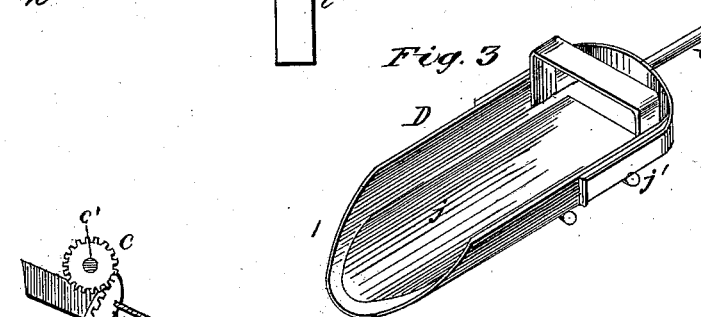
Figure 2:
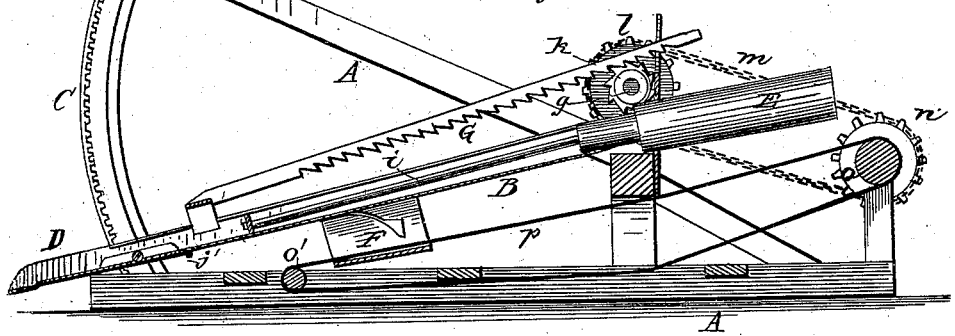
Figure 4:
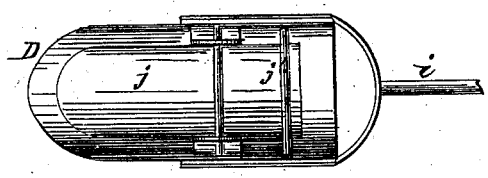
Figure 5:
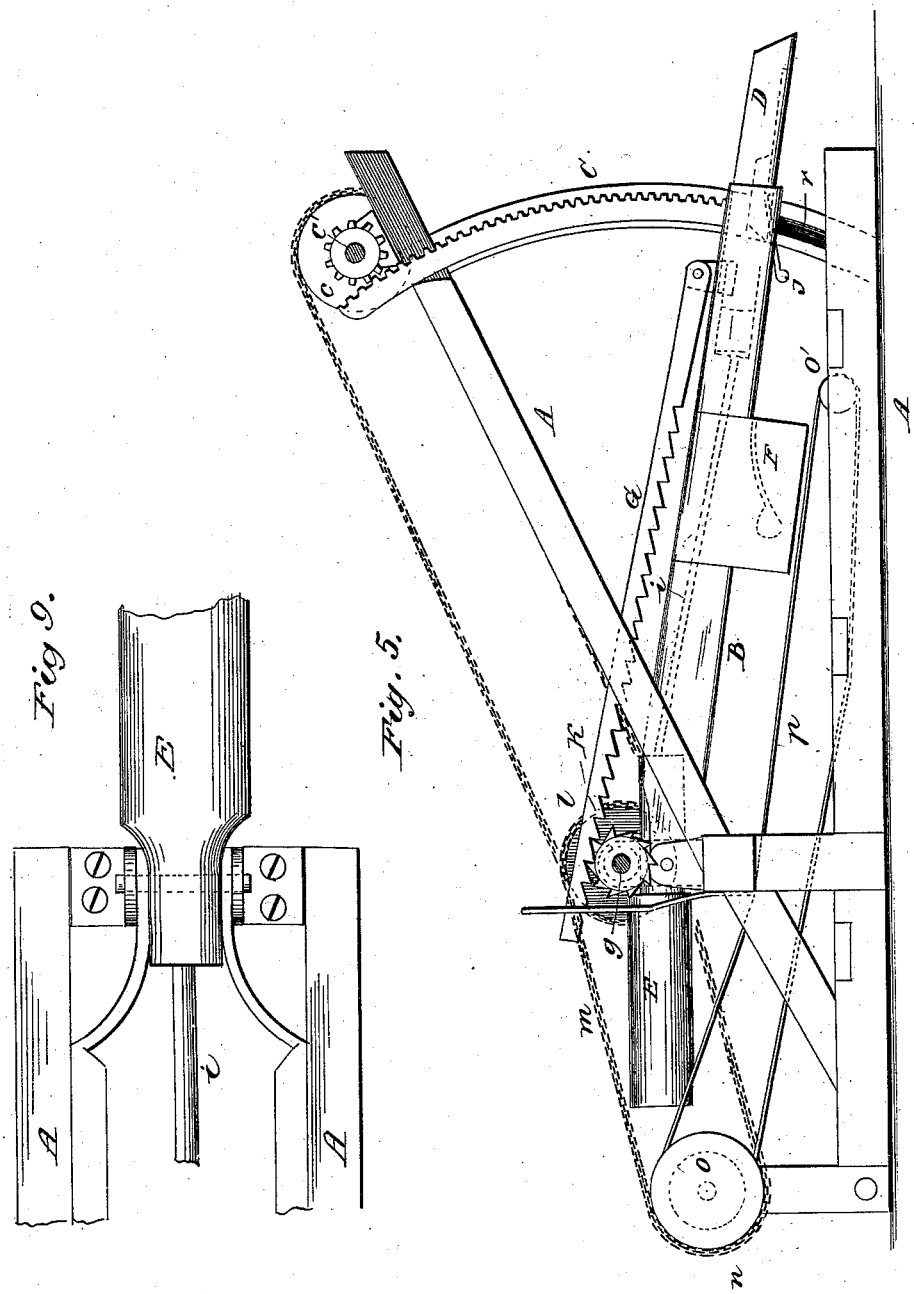
Figure 6:
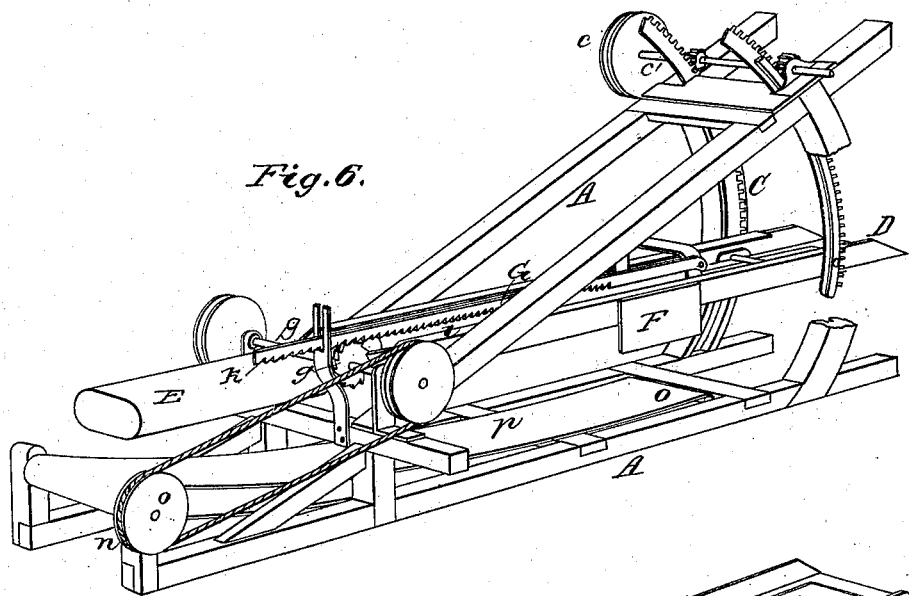
Figure 7:
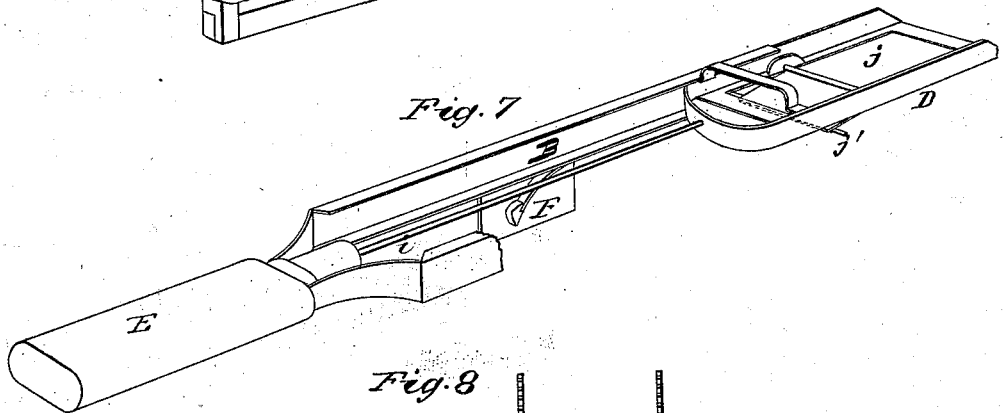
Figure 8:
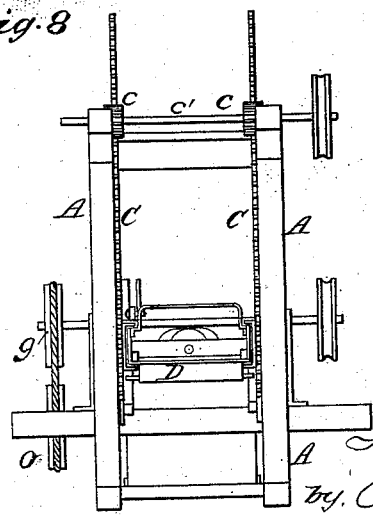

Figure 1, Sheet 1, is a plan view of my improved excavator. Fig. 2 is a vertical longitudinal section thereof. Figs. 3 and 4 are respectively a perspective and an inverted plan view of a modification of the shovel or excavating implement; and Fig. 5, Sheet 2, is a view, partly in side elevation and partly in section, of my excavator. Fig. 6, Sheet 3, is a perspective view of my improved excavator. Fig. 7 is a detached similar view of the piston-cylinder, piston-rod, excavating implement or shovel and its ways, and one of the dumping-latches, a portion of one of the ways being broken away; and Fig. 8 is a front elevation of my excavator. Fig. 9 is a detailed view of the pivots of the inclined ways and cylinder.

Corresponding parts in the two figures are denoted by like letters.

This invention appertains to certain improvements in that class of excavators in which the shovel or excavating implement is driven or operated by gas or steam pressure.

It consists, first, in the construction of the shovel or implement; secondly, of mechanism for dumping or tilting the bottom of the shovel with its load of dirt and resetting said bottom after the dumping of its load; thirdly, of means for operating the endless apron or belt which discharges the dirt dumped thereon by the shovel; and, fourthly, of mechanism for vertically adjusting the forward end of the shovel or cutting implement, substantially as hereinafter more fully set forth.

In the annexed drawings, A marks a frame. B B are inclined ways, the rear or elevated ends of which are pivoted in plates secured upon the frame A. Their forward ends are connected to toothed segments or racks C, arranged and secured in position alongside of the curved uprights of the frame A. With these racks engage pinions $c$ upon a shaft, $c'$, suitably supported upon the frame A, and preferably provided with a wheel, $d$. This wheel is driven by an endless-chain belt, $e$, extending from a similar loose wheel, $f$, upon a shaft, $g$, suitably supported upon the rear portion of the frame A. The shaft $g$ is also provided with a clutch, $h$, with which the wheel $f$ is adapted to engage.

D is the shovel or excavating implement, fitting in the ways B B, and connected by a rod, $i$, to a piston in the cylinder E. The shovel or implement D is provided with a bottom, $j$, hung therein, and having lateral projections or studs $j'$, which will be referred to further presently.

About midway the length of the ways B B, and attached to pendants depending from said ways, are inclined spring bars or latches F, the upper ends of which are free, and bear against the under side of the said ways.

It will be observed that as the shovel moves upwardly with its load the lateral projections $j'$ of its tilting bottom $j$ will pass down beneath the latches F, which will tilt said bottom, and thus dump its load of dirt upon the endless carrier or belt below, and after passing the lower ends of said latches, allow the said bottom to be reset or return to its normal position.

Upon the return movement of the shovel or implement it will be noticed that the lateral projections $j'$ of its bottom will be allowed to pass between the upper or free ends of the latches and the bottom of the ways B B without interruption.

The cylinder E is trunnioned upon the same axis with the ways B B in plates or studs upon the frame A, to enable the cylinder and ways to be adjusted or move in the same plane, and the said cylinder is adapted to be charged with gas or steam from an engine suitably disposed, by the pressure of which gas or steam the piston and piston-rod are driven and the shovel or cutting implement possessed of the required movement to excavate the earth.

G is a saw-toothed bar, connected, preferably, to a bail on the shovel D, and engaging a pinion, $k$, upon the shaft $g$, by which said shaft is driven during the upward movement of the shovel, and also a pulley or sprocket-wheel, $l$, upon the same shaft. This wheel and endless-chain belt $m$, extending from a similar wheel, $n$, upon the axis of a roller, $o$, supported upon uprights of the frame A, impart motion to the endless carrier or belt $p$, which discharges the dirt dumped thereon by the shovel. The carrier $p$ embraces the roller $o$ and roller $o'$ bearing in the bottom of the forward end of the frame A.

It will be seen that as the teeth of the bar G point toward the rear end of the machine, or so as not to cause the pinion $k$ to be operated when the shovel D is on its way to be loaded, the lowering mechanism of the shovel and its ways at this juncture will not be affected, and thus remain stationary until the shovel has taken up its load and is about to ascend. At the latter-mentioned juncture the bar G will engage the pinion $k$, and thus cause its shaft to operate the wheel $f$, chain or belt $e$, wheel $d$, shaft $c'$, pinions $c$, and the lowering racks C, to let the forward ends of the ways B down into the excavation just made by the ascending shovel or implement.

It will be noticed that the clutch $h$ transmits motion of the pinion-shaft $g$ to the pulley or wheel $f$.

Having thus described my invention, what I claim, and desire to secure by Letters Patent, is—

1. The shovel or implement D, provided with a tilting bottom, $j$, having lateral projections $j'$, substantially as and for the purpose specified.

2. In combination with the shovel D, having the tilting bottom $j j'$, the spring bars or latches F, substantially as and for the purpose described.

3. The combination of the shovel or implement D, having a tilting bottom, $j j'$, ways B B, latches F, piston and its rod $i$, and gas or steam cylinder E, substantially as and for the purpose set forth.

4. In combination with the shovel or implement D and the ways B B, the saw-toothed bar G, pinion $k$, shafts $g$ $c'$, wheels $d$ $f$, belt $e$, pinions $c$, and toothed segments or racks C, substantially as and for the purpose specified.

5. The combination of the shovel or implement D and serrated bar G with the shaft $g$, provided with the pinion $k$ and wheel $l$, belt $m$, wheel $n$, rollers $o$ $o'$, and carrier $p$, substantially as and for the purpose described.

6. The combination, with the shovel D, its ways B B, and carrier or belt $p$, of the cylinder E, its piston and rod $i$, rack or serrated bar G, shaft $g$, provided with pinion $k$ and wheels $f$ $l$, belts $e$ $m$, wheel $n$, shaft $c'$, provided with wheel $d$ and pinions $c$, and segmental rack-bars C, substantially as and for the purposes set forth.

In testimony that I claim the foregoing as my own I affix my signature in presence of two witnesses.

ANDERSON WOOD TERRILL.

Witnesses:
S. M. EDWARDS,
J. M. RILEY.